July 31, 1928.
W. KASSEBEER
SUGAR CANE PLANTER
Filed Dec. 20, 1923
5 Sheets-Sheet 5
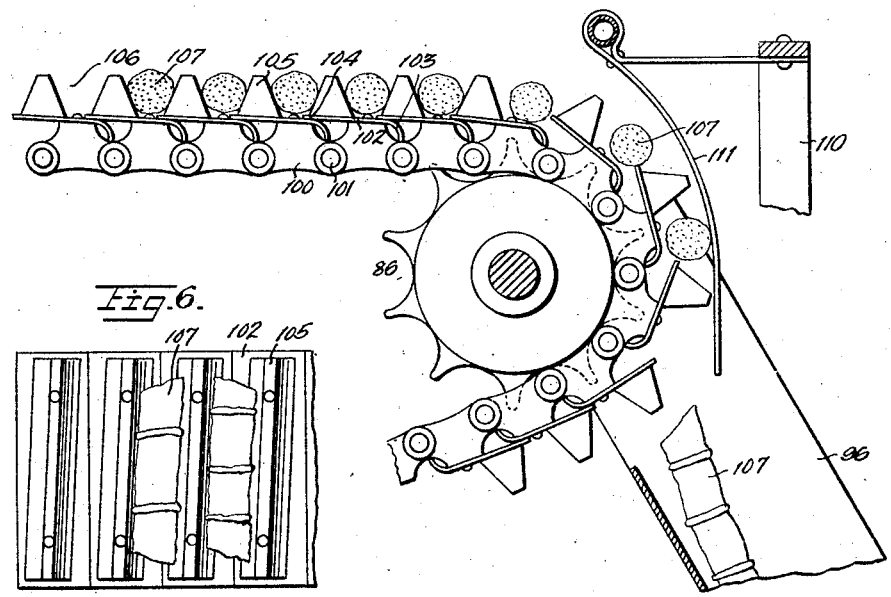
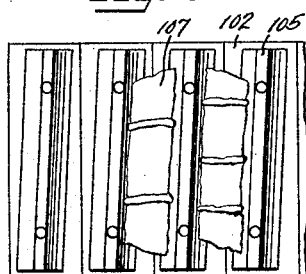
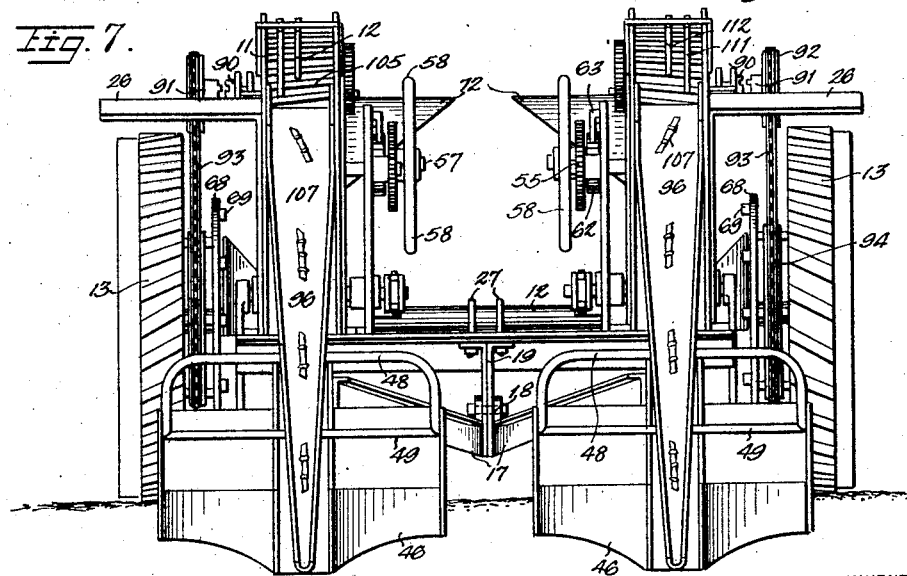
WITNESSES
INVENTOR
W. KASSEBEER
ATTORNEYS Patented July 31, 1928.

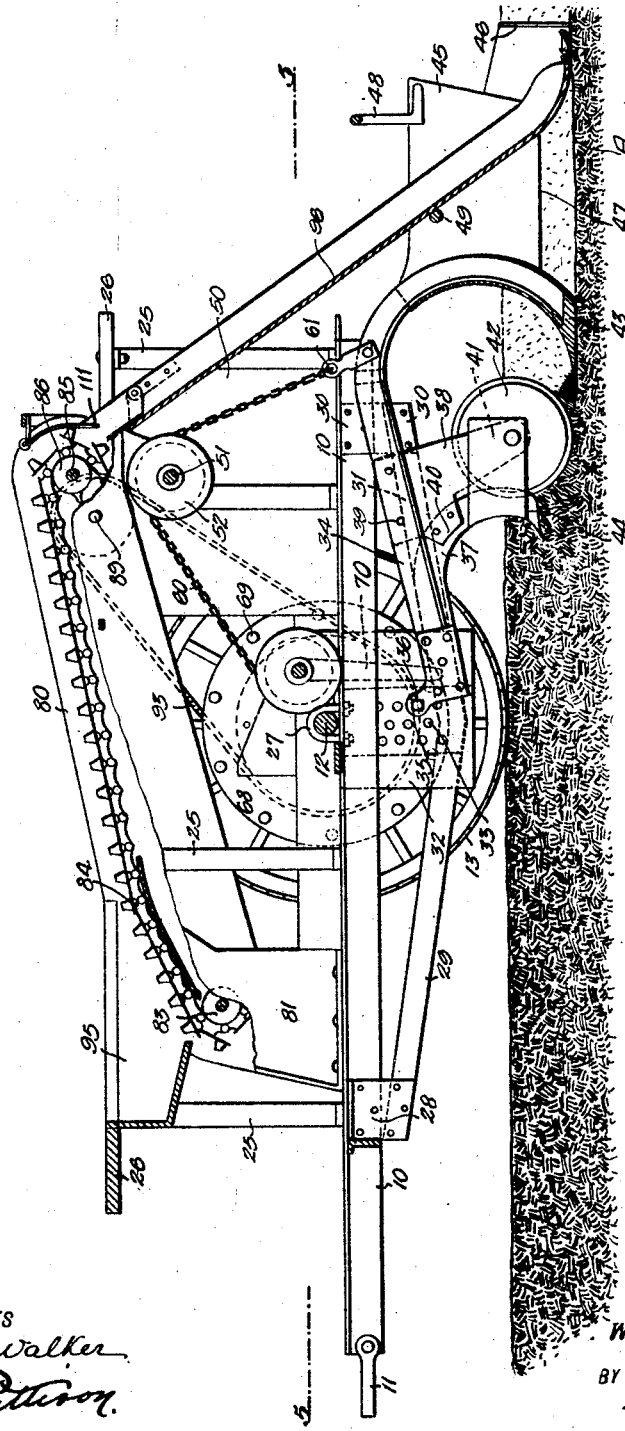

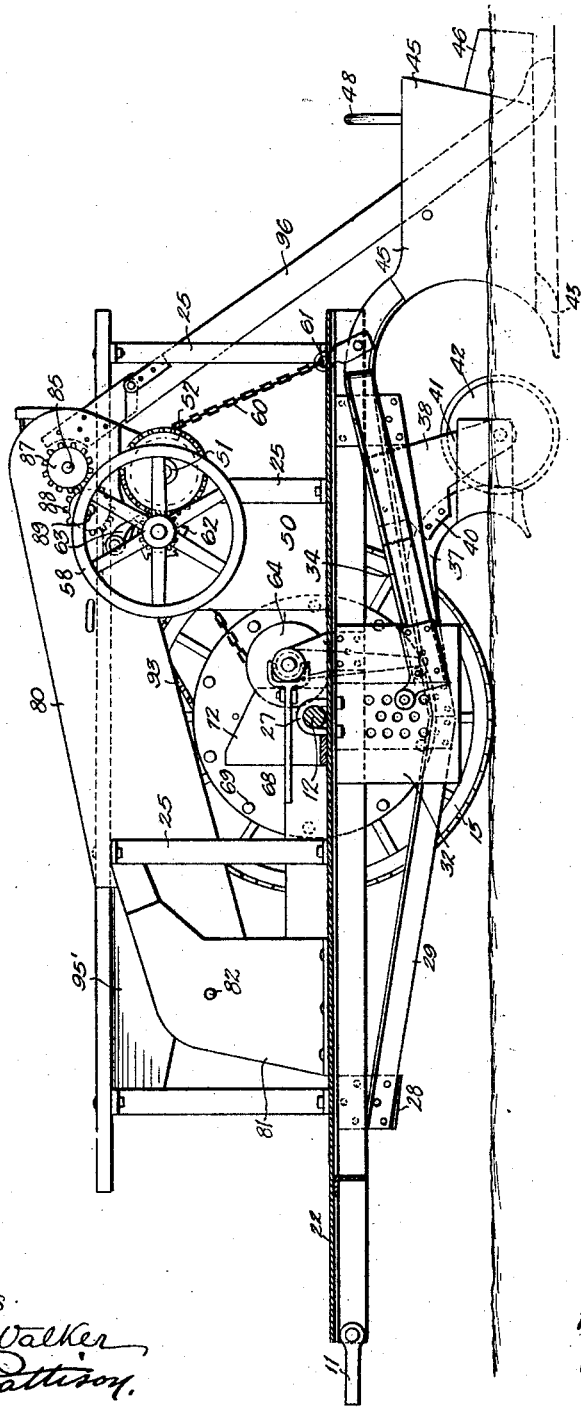

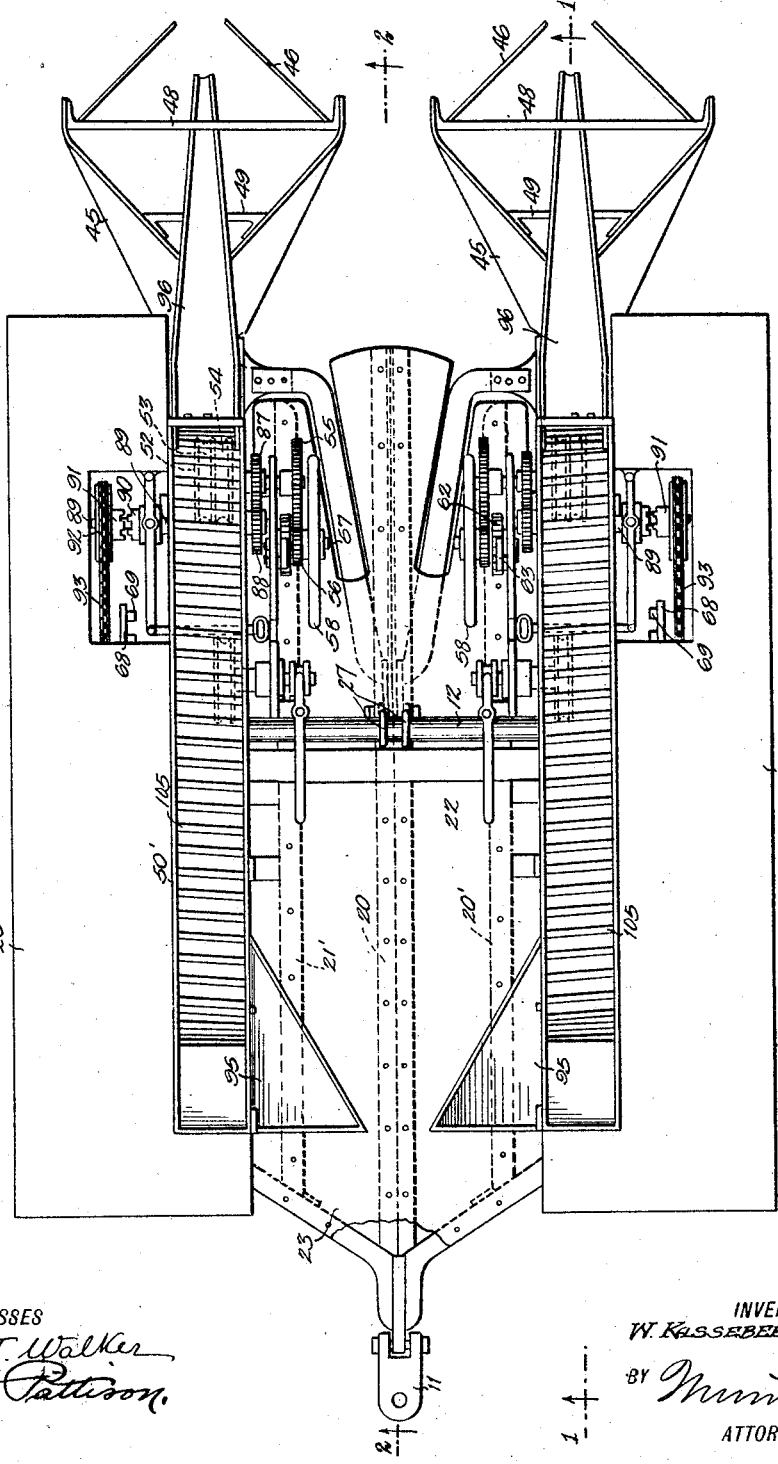

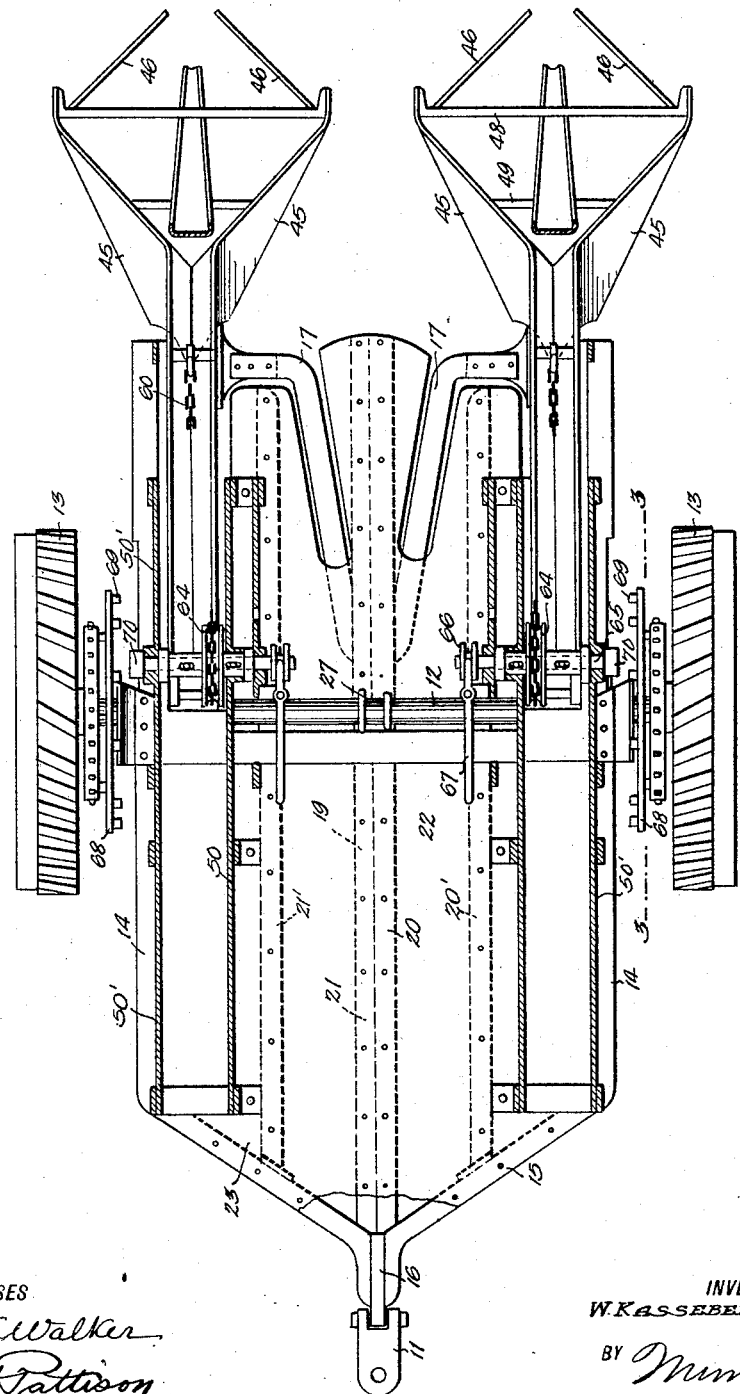

1,678,643

UNITED STATES PATENT OFFICE.

WILLIAM KASSEBEER, OF LIHUE, TERRITORY OF HAWAII.

SUGAR-CANE PLANTER.

Application filed December 20, 1923. Serial No. 681,817.

The present invention relates to new and useful improvements in planters, and it pertains more particularly to machines for planting sugar cane.

It is one of the objects of the invention to provide a machine for planting sugar cane, in which the machine will open a furrow, deposit short sections of cane stalks therein and close the furrow behind the deposited cane stalk to cover the same.

It is a further object of the invention to construct a machine in such a manner that the cane stalks are turned into parallelism with the furrow before they are deposited therein.

It is a further object of the invention to provide plows for opening the furrow associated with means for covering the furrow after the sugar cane has been deposited therein.

With the above and other objects in view, reference is had to the accompanying drawings, in which Figure 1 is a longitudinal sectional view of a planter constructed in accordance with the present invention;

Figure 2 is a view in side elevation of the machine, said view being partly in section;

Figure 3 is a top plan view of the machine;

Figure 4 is a horizontal sectional view thereof;

Figure 5 is a detail sectional view showing a portion of the cane feeding mechanism;

Figure 6 is a detail plan view of a section of the cane conveyor; and

Figure 7 is a view in rear elevation of the machine.

Referring more particularly to the drawings, the reference character 10 designates the frame of the machine, and carried by the forward end of the frame there is a clevis or the like 11 by means of which suitable draft means may be attached to the machine.

The machine 10 is supported by an axle 12, and carried at each end of said axle 12 there is a supporting wheel 13.

As more clearly shown in Figure 4, the frame comprises side members 14, the forward end of each of which is inwardly bent as at 15, and said ends are secured together as at 16. Connected to the rear end of each side member and projecting inwardly and forwardly thereof there is a brace 17, and said braces 17 are connected as at 18 to a longitudinally extending brace 19, which last mentioned brace comprises two members 20 and 21.

Connected to the forward end of the frame and extending rearwardly in parallelism with one of the side frames, there is a brace 20' one one side of the machine and on the opposite side of the machine there is a corresponding brace 21'.

Mounted on top of the side frames 14 there is a platform 22, and said platform extends forwardly of the machine, as shown at 23 in Figs. 3 and 4. Projecting vertically from the platform 22, on opposite sides of the machine, there is a plurality of standards 25, and the standards on each side of the machine support a table 26. The frame is supported from the axle 12 by means of clips or the like, 27, the said clips 27 being of inverted U-shape and passing around said axle at the central portion thereof, as more clearly shown in Fig. 4. Connected to each of the side frames 14, near the forward end thereof, there is a plate 28, and secured to said plate 28 and extending rearwardly and downwardly there is a brace 29. Connected to each of the side frames 14, near the rear thereof, there is a plate 30, and extending forwardly and downwardly from each plate 30, there is a brace 31, it being understood that the brace 31 at its rear end is secured to the plate 30.

Secured to each of the side frames 14 of the machine at a point approximating its center, there is a depending plate 32, and the rear end of the braces 29 and the forward end of the braces 31 are connected at their respective plates 32. Each plate 32 has a plurality of openings 33, and such openings 33 serve the means for adjustably pivoting a plow beam 34 to each of the plates. Each of the plow beams has on its forward end an upstanding lug 35, which is adapted to receive a bolt 36, which bolt forms the pivotal point of the plow beam. Secured to each of the plow beams, there is an auxiliary plow beam 37, said auxiliary plow beam 37 being also secured to a plate 38, which in turn is secured, as at 39, to its respective plow beam. Each of the plates 38 has a forward projection 40, which is attached to its respective auxiliary plow beam 37, and depending from each of the plates 38 there is an extension 41 which serves the means for mounting a colter wheel 42.

Carried by each of the plow beams 34 and positioned behind its respective colter wheel 42, there is a plow 43, and carried by each of the plow beams 37 and positioned forwardly of its respective colter wheel 42, there is a plow 44. Trailing each of the plows 43 are mold boards 45 and disposed rearwardly of said mold boards 45, there are covering elements 46, which latter serve to close the furrow opened by its respective plow, by passing thereover.

As more clearly shown in Fig. 1, it will be noted that the bottom edge 47 of each of the mold boards is slightly above the bottom of the furrow, which is indicated by the reference character A, and this construction permits of the lower portion of the furrow being closed, the upper portion thereof remaining open in order that irrigation of the planted crop may be had. The covering elements 46, however, extend to the bottom of the furrow and serve to cover thereinto the earth removed therefrom by means of the deeper plow 43. The mold boards 45 are connected together by means of a transversely extending arched brace 48 and a transversely extending brace 49.

Secured to each of the side braces 20' and 21', near their rear ends, and extending upwardly, are plates 50, and such plates 50 together with plates 50' carried by the side frames, form the support for a portion of the mechanism employed to elevate the plows and which will now be described.

Mounted in the plates 50 and 50' at each side of the machine, there is a shaft 51, and carried by each of the shafts 51, there is a sheave 52. As shown in dotted lines in Fig. 3, these sheaves are of the double type and have two grooves 53 and 54. Carried by each of the shafts 51, there is a gear 55, and such gear 55 meshes with a gear 56 mounted on the shaft 57, and such shaft carries a hand wheel 58 by means of which it is rotated. It is to be understood that this mechanism is duplicated on opposite sides of the machine in order that both of the plows may be elevated, and when more than two plows are employed, there will be one of these mechanisms for elevating each of the plows employed.

By this construction it is apparent that as the hand wheels 58 are operated the plows will be elevated by reason of the shafts 52 being rotated and taking up on a chain 60, one end of which is attached, as at 61, to the plow. In addition to the gear 56 operated by the hand wheel 58, there is a circular rack member 62, with which a pivoted pawl 63 is adapted to engage to hold the plows elevated.

The foregoing describes the hand operated mechanism for elevating the plows, and in addition thereto, there is mechanically operated means for elevating the plows. This mechanically operated means comprises a sheave mounted on each side of the machine and forwardly of the first-mentioned sheaves 52, said sheaves being designated by the reference numeral 64. The sheaves 64 are mounted on a sliding shaft 65, one end of which carries a clutch collar 66 engaged by a clutch lever 67 and by which the shaft is reciprocated in its mounting.

As the depending levers move to their uppermost position, they engage a cam member 72, which moves them inwardly of the machine out of the path of travel of the projections 69 of the disks 68 and also prevents their moving to a position where the plows will again be lowered, unless this latter operation is carried out manually by the operator.

It is to be understood that as the depending levers 70 are moved to their uppermost position and engaged by the cam member 72, they are prevented from moving backwardly to lower the plows by means of the dog or pawl 63 engaging the circular rack 62, as heretofore described, since this mechanism together with the hand wheel is operated even though the plows are operated manually.

The reference numeral 80 designates a housing, of which there is one at each side of the machine, and mounted in supports 81 there is a shaft 82, which shaft 82 carries a sprocket 83 around which a conveyor 84 passes. Mounted at the other end of the housing 80, there is a shaft 85 which carries a pulley 86 around which the conveyor 84 also passes. Mounted on this shaft 85 exteriorly of the housing 80, there is a gear 87 which meshes with a gear 88. The gear 88 is carried by a shaft 89, and mounted on the shaft 89, there is one member 90 of a clutch, the other member 91 of the clutch being carried by a sprocket wheel 92, which is rotatably mounted on the shaft 89, and passing around said sprocket wheel 92 there is a driving chain 93. This driving chain 93 also passes around a sprocket 94 carried by the traction wheels or secured to the axles in such a manner as to drive the pulley 92 as the machine is moved along the ground.

It is to be understood that there is one conveyor at each side of the machine, and the forward end of each of the conveyor housings 80 is formed with a hopper 95, while the rear end of the housing is adapted to discharge into the inclined chute 96, the lower end of which is positioned between the mold boards 45 and in advance of the covering elements 46 heretofore mentioned.

By reference to Fig. 5 it will be noted that the conveyor comprises a plurality of link elements 100 pivotally connected together, as at 101, and each of said link elements has a plate 102 secured thereto, one end of which is downwardly curved, as at 103, and the other end partially overlapping the downwardly curved end of the plate carried by the next adjacent pivoted member, as designated by the reference character 104 in Fig. 5. This portion 104 of the plates 102 is adapted to carry a slat or the like, 105. By this construction the slats are spaced with respect to one another to provide a recess or space 106 therebetween, which space or recess is adapted to receive a section of cane 107 to be planted.

By this construction it is apparent that as the conveyors pass around the pulleys 86, the plates 102 are rocked or moved in such a manner that the sections of cane 107 are discharged from the conveyors.

The reference character 110 designates a frame and carried by the frame there are two resilient fingers 111 and 112. The resilient finger 111 is longer than the resilient finger 112, and by this construction, inasmuch as the lengths of cane 107 clear the resilient finger 112 before they clear the resilient finger 111, such lengths of cane are turned in such a manner that their longitudinal axes will be parallel to the longitudinal axis of the chute to insure of the lengths of cane passing through the chute in longitudinal relation thereto and lying longitudinally in the furrows provided therefor. This action is clearly shown in Fig. 8.

The device operates in the following manner:

The machine is moved through the field by a tractor or in any other manner, and in its movement through the field the plows serve to open the furrows. An operator stands on each side of the machine on the portion 23 of the platform, adjacent the hopper 95 and feeds the lengths of cane into the hopper, the cane being in bags or resting on the tables 26, as desired. One length of cane is placed in each of the spaces 106 of the conveyor, as is shown more clearly in Fig. 5, and the conveyor moves the lengths of cane rearwardly of the machine until they are engaged by the fingers 111 and 112. As heretofore described, these lengths of cane are then turned until they occupy a position longitudinally of the chutes 96 down which they slide to the open furrows and are afterwards covered over by the covering elements 46.

A machine constructed in accordance with the present invention not only facilitates the planting of cane fields, but, at the same time, insures an evenly spaced relation of the lengths of cane and a proper positioning thereof in the opened furrows.

While in the present instance the machine is shown as planting two rows of cane at a single operation, it is obvious that any number of rows may be planted without departing from the spirit of the invention.

What is claimed is:

In a machine for planting sugar cane, furrow opening means, a conveyor upon which lengths of sugar cane stalks are adapted to be received in transverse relation thereto, a tiltable chute having a curved bottom at its lower end and straight walls into which said conveyor discharges said lengths of cane stalks, said chute having a rearwardly turned horizontal lower end adapted to be dragged in the base of the furrow, and resilient means contacting with said conveyor located at the point of discharge of said conveyor and adapted to engage the cane stalks whereby said cane stalks are caused to assume a position in longitudinal relation to the chute in which position the cane stalks are deposited in the open furrow.

WILLIAM KASSEBEER.